United States Patent [19]

Babil et al.

[11] 4,064,294

[45] Dec. 20, 1977

[54] IN-SITU PRODUCTION OF MICROCAPSULES ON A SUBSTRATE

[75] Inventors: Simon Babil, Trumbull, Conn.; James A. Claar, Monroeville; Rodger G. Temple, Gibsonia, both of Pa.

[73] Assignee: PPG Industries, Inc., Pittsburgh, Pa.

[21] Appl. No.: 583,312

[22] Filed: June 2, 1975

[51] Int. Cl.$^2$ .............................................. B05D 3/02
[52] U.S. Cl. .................................. 427/373; 106/312; 252/316; 260/2.5 R; 260/2.5 M; 427/379; 427/388 A; 427/388 C
[58] Field of Search .................. 427/373, 379, 388 A, 427/388 C; 252/316; 260/2.5 R, 2.5 M; 106/312

[56] References Cited

U.S. PATENT DOCUMENTS

| | | | |
|---|---|---|---|
| 3,157,533 | 11/1964 | Clancy et al. | 427/373 |
| 3,336,155 | 8/1967 | Rowe | 252/316 |
| 3,472,798 | 10/1969 | Pitchforth et al. | 260/2.5 R |
| 3,554,786 | 1/1971 | Lieberman | 427/373 |
| 3,585,149 | 6/1971 | Vassiliades et al. | 252/316 |
| 3,661,807 | 5/1972 | Seiner | 260/2.5 M |
| 3,669,899 | 6/1972 | Vassiliades et al. | 106/312 |
| 3,707,514 | 12/1972 | Vassiliades et al. | 260/2.5 |
| 3,720,534 | 3/1973 | Macaulay et al. | 260/2.5 R |
| 3,779,941 | 12/1973 | Powell | 106/312 |
| 3,819,542 | 6/1974 | Kreider | 260/2.5 M |
| 3,824,114 | 7/1974 | Vassiliades et al. | 252/316 |
| 3,844,816 | 10/1974 | Vassiliades et al. | 252/316 |
| 3,915,726 | 10/1975 | Hansen | 260/2.5 R |

*Primary Examiner*—Harry J. Gwinnell
*Assistant Examiner*—Sadie L. Childs

*Attorney, Agent, or Firm*—Carl T. Severini; Frank J. Troy

[57] ABSTRACT

Microcapsules are produced in-situ in a film or during the manufacturing process of a water-based coating composition from which the film is formed. A principal process involves the in-situ production of void-containing microcapsules in a film formed from a water-based coating. This principal process involves as a first step the preparation of a polymer composition which may be a homogeneous solution containing a water-immiscible organic polymer, a water-immiscible solvent for the polymer, and a water-immiscible lower volatility non-solvent which is miscible with the solvent; or an emulsion containing as the continuous phase a water-immiscible organic polymer dissolved in a water-immiscible solvent for the polymer and, as the discontinuous phase, droplets of a lower volatility non-solvent dispersed in the continuous phase. This polymer composition is then emulsified under agitation and in the presence of a surfactant into a water-based coating composition. The water-based coating composition containing this emulsified polymer composition is then applied to a substrate and the solvent is evaporated from the polymer composition to produce microcapsules containing discrete droplets of the non-solvent. Subsequent drying of the water-based coating and evaporation of the non-solvent from the microcapsules produces a film having incorporated therein structured, closed-cell, void-containing microcapsules with the voids serving to provide opacity and gloss control to the film. In an alternative to the principal process, microcapsules containing the non-solvent are produced in-situ in the water-based coating composition prior to forming a film therefrom.

29 Claims, No Drawings

IN-SITU PRODUCTION OF MICROCAPSULES ON A SUBSTRATE

BACKGROUND OF THE INVENTION

The use of void-containing microcapsules as opacifying agents in coatings is known in the art, e.g., see U.S. Pat. Nos. 3,585,149, 3,669,899, 3,707,514 and 3,779,941. As pointed out in U.S. Pat. No. 3,779,941, these void-containing microcapsules possess an opacifying power which is equal to or substantially greater then inorganic pigments (e.g., titanium dioxide) on a weight basis. However, while these void-containing microcapsules provide excellent opacity to films formed from coating compositions in which they are incorporated, techniques heretofore employed in producing such coating compositions (e.g., paints) have proven to be costly and time-consuming. Thus, in prior processes, as exemplified by the above-mentioned patents, the void-containing microcapsules are first produced by one of several processes and then incorporated into the coating composition by admixture thereto followed by stirring. As will be apparent, such processes involve a number of processing steps and procedures and require careful handling of the microcapsules. Typical of processes which illustrate such prior processes is that of U.S. Pat. No. 3,779,941. As disclosed in that patent, air-containing microcapsules (i.e., microcapsular opacifiers) are prepared by admixing a solution comprising an oil-soluble, partially condensed thermosetting condensation product in a water-immiscible, oily material and an aqueous solution of a water-soluble polymeric material, thereby forming an emulsion, following which the emulsion is treated in such a manner as to form microcapsules containing the oily material, thereby producing precursor microcapsules and, finally, the precursor microcapsules are treated (i.e., heated) to expel the oily material and replace it with air. As disclosed in this patent, these microcapsules, either in the form of air-containing microcapsules or precursor microcapsules (i.e., containing oil) are then dispensed in the paint composition. As will be evident, this requires a considerable number of processing steps to form the microcapsules and then it is necessary to employ an additional step in incorporating the microcapsules into the paint composition. As indicated previously, this is an expensive and time-consuming process.

Accordingly, it would be highly advantageous in terms of cost and processing time if the microcapsules could be produced in-situ during the manufacturing process of the coating composition, or in a film formed from the coating composition. The present invention accomplishes this desirable result while providing for the advantages of opacity and gloss control while such microcapsules impart to films formed from such coatings.

DESCRIPTION OF THE INVENTION

It has now been found that microcapsules can be produced in-situ in a film formed from a water-based coating composition or, alternatively, during the manufacturing process of the water-based coating composition. A principal process involves the in-situ production of void-containing microcapsules in a film formed from a water-based coating composition. This principal process involves as a first step the preparation of a polymer composition which may be a homogeneous solution containing a water-immiscible organic polymer, a water-immiscible lower volatility non-solvent which is miscible with the solvent; or an emulsion containing as the continuous phase a water-immiscible organic polymer dissolved in a water-immiscible solvent for the polymer and, as the discontinuous phase, droplets of a lower volatility non-solvent dispersed in the continuous phase. This polymer composition is then emulsified under agitation and in the presence of a surfactant into the water-based coating composition. The coating composition containing this emulsified polymer composition is then applied to a substrate and the solvent is evaporated from the polymer composition to produce microcapsules containing discrete droplets of the non-solvent. Subsequent drying of the water-based coating and evaporation of the non-solvent produce a film having incorporated therein structured, closed cell, void-containing microcapsules with the voids serving to provide opacity and gloss control to the film. In an alternative to the principal process, microcapsules containing the non-solvent are produced in-situ in the water-based coating composition prior to forming a film therefrom. The process is extremely versatile and flexible and, in addition to providing for the in-situ production of void-containing microcapsules in a film or microcapsules containing non-solvent in the water-based coating composition from which the film is formed permits the in-situ production in the film of microcapsules in which pigments are entrapped in the voids or in the polymeric walls of the microcapsule or in which certain non-solvents which serve a secondary function remain entrapped in the microcapsules until performance of the function is desired. Such non-solvents include, for instance, medicaments minerals, biocides, perfumes, chemical reactants, fertilizers, etc.

As indicated, the principal process involves as a first step the preparation of a polymer composition which may be a homogeneous solution containing a water-immiscible organic polymer, a water-immiscible solvent for the polymer and a water-immiscible lower volatility non-solvent which is miscible with the solvent; or an emulsion containing as the continuous phase a water-immiscible organic polymer dissolved in a water-immiscible solvent for the polymer and as the discontinuous phase, droplets of a lower volatility non-solvent dispersed in the continuous phase.

A wide variety of organic polymers may be utilized in preparing the above-mentioned homogeneous solution with the sole criteria being that they are insoluble in water. Such polymers may be of either the thermoplastic or thermosetting resin types.

Examples of thermoplastic resins which may be utilized include cellulose derivatives (e.g., ethyl cellulose, nitrocellulose, cellulose acetate, cellulose propionate and cellulose acetate butyrate); acrylic resins (e.g., homopolymers and copolymers with each other or with other monomers of esters, acids or other monomers containing an acrylyl or substituted acrylyl group, such as methyl methacrylate, ethyl methacrylate, butyl acrylate, butyl methacrylate, acrylonitrile, acrylic acid and methacrylic aicd); polyolefins (e.g., polyethylene and polypropylene); polyamides; polycarbonates; polystyrene; copolymers of styrene and other vinyl monomers, such as acrylonitrile; vinyl polymers, such as homopolymers or copolymers of vinyl acetate, vinyl alcohol, vinyl chloride and vinyl butyral; homopolymers and copolymers of dienes, such as polybutadiene, butadiene-styrene copolymers and butadiene acrylonitrile copolymers.

A preferred group of thermoplastic polymers are copolymers of acrylates, such as 2-ethylhexyl acrylate, and/or methacrylates, such as dibutyl maleate or fumarate, butyl glycidyl maleate or fumarate and glycidyl methacrylate. These thermoplastic polymers may be prepared in or dissolved in a solvent, such as benzene, toluene, butanol, xylene, or the like.

Graft copolymers or block copolymers may also be used as the thermoplastic resin. Such copolymers possess segmental periodicity, i.e., they contain continuous sequences of one monomer that are not governed by statistical distribution. They may be formed by methods known in the art, such as by polymerizing one or more monomers in the presence of an appropriate performed polymer and catalyst. The preparation of graft copolymers is described, for example, in U.S. Pat. No. 3,232,903. The preformed polymer may be, for example, a polymeric ester of acrylic acid or methacrylic acid, such as a copolymer of an ester of methacrylic acid or acrylic acid formed with an alcohol having 4 to 18 carbon atoms, or of mixtures of such esters with esters of methacrylic acid or acrylic acid formed with alcohols having one to 5 carbon atoms. Monomers which may be polymerized in the presence of the preformed polymer include vinyl esters of fatty acids, esters of acrylic acid or methacrylic acid, and various other monomers copolymerizable with the preformed polymer. Some specific examples include: methyl methacrylate, ethyl acrylate, butyl methacrylate, acrylonitrile, acrylamide, styrene, acrylic acid, methacrylic acid, maleic anhydride and hydroxyalkyl acrylates or methacrylates, such as B-hydroxyethyl methacrylate.

Mixtures of two or more thermoplastic resins may also be used in this invention. Thus, for example, when a graft copolymer is prepared as described above, there is generally obtained a mixture of a graft copolymer comprising grafts of the polymerized monomer on the prepolymer, and a homopolymer of the monomer (or a copolymer if two or more different monomers are employed). This mixture of polymers may be used as such in the practice of this invention, or it may be separated into its component parts and either the graft copolymer or homopolymer used alone.

Various thermosetting resins may be utilized in preparing the above solution. Such resins are curable to a crosslinked thermoset condition by the use of either heat and/or a curing catalyst.

One preferred group of thermosetting resins which may be utilized are interpolymers of hydroxyl esters of ethylenically-unsaturated acids with at least one other polymerizable ethylenically-unsaturated monomer, usually admixed with a crosslinking agent therefor, such as an aminoplast resin. Interpolymers of hydroxyl esters of unsaturated acids with at least one other copolymerizable ethylenically-unsaturated monomer are prepared by interpolymerizing a hydroxyalkyl ester of an ethylenically-unsaturated carboxylic acid and at least one other ethylenically-unsaturated monomer copolymerizable therewith. In many cases, more than one hydroxyalkyl ester is included in the interpolymer and generally several monomers, in addition to the hydroxyalkyl ester or esters, are employed. These interpolymers are produced in a manner well known in the art, using conventional procedures utilizing free radical catalysts or other mechanisms.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate, hydroxypropyl acrylate and methacrylate. Combinations of these esters are also widely used. However, there may also be employed similar esters of other unsaturated acids, for example, ethacrylic acid, crotonic acid, and similar acids having up to 6 carbon atoms, as well as esters containing hydroxyalkyl radicals such as hydroxybutyl esters and hydroxylauryl esters.

The monomer or monomers with which the hydroxyalkyl ester is interpolymerized can be any ethylenic compound copolymerizable with the ester, the polymerization taking place through the ethylenically-unsaturated linkages. Preferred comonomers are alkyl esters of ethylenically-unsaturated carboxylic acids or vinyl aromatic hydrocarbons, or both. Among these preferred comonomers are the ethyl, methyl, propyl, butyl, hexyl, ethylhexyl and lauryl acrylates and methacrylates, as well as similar esters having up to about 20 carbon atoms in the alkyl group. Among the vinyl aromatic hydrocarbons generally utilized are styrene and vinyl toluene. Other useful monomers include monoolefinic and diolefinic hydrocarbons, halogenated monoolefinic and diolefinic hydrocarbons, halogenated monoolefinic and diolefinic hydrocarbons, unsaturated esters of organic and inorganic acids, esters of saturated acids, nitriles, unsaturated acids, and the like. Examples of such other monomers include 1,3-butadiene, vinyl butyrate, vinyl acetate, dimethyl maleate, acrylonitrile, methacrylonitrile, acrylic acid, methacrylic acid, and the like.

Crosslinking agents for interpolymers of hydroxyalkyl esters are materials which contain functional groups reactive with the hydroxyl groups of the interpolymer. Examples of such reactive materials include polyisocyanates, such as toluene diisocyanate and isocyanato-containing polymeric products; aminoplast resins, such as hexa(methoxymethyl)melamine and others described hereinafter; epoxy resins, such as polyglycidyl ethers of bisphenol A, and others, e.g., silicone resins.

Another preferred group of thermosetting resins which may be utilized in preparing the above-described solution are admixtures of alkyd resins, which may also be used with crosslinking agents therefor, such as aminoplast resins. Alkyd resins are obtained by the condensation of a polyhydric alcohol and a polycarboxylic acid. Any of the oil-modified or oil-free alkyd resins known in the art can be utilized.

Further details for the preparation of alkyd resins are described in the book entitled "ORGANIC COATING TECHNOLOGY", Volume 1, by Henry F. Payne, published by John Wiley & Sons (1954), Chapter 7.

Crosslinking agents for the alkyd resins include those materials which contain functional groups reactive with the hydroxyl groups of the alkyd, examples of which have been previously described in relation to crosslinking agents for interpolymers of hydroxyalkyl esters. The preferred crosslinking agents are aminoplast resins which will be more fully described hereinafter. Various proportions of alkyd resins and aminoplast resin crosslinking agent may be employed in the practice of this invention. For example, the aminoplast resin may constitute from about 5 to about 50 percent by weight of the mixture of the two resins although this ratio is not critical. The blend of the alkyd resin and the aminoplast resin may also include various added vehicular agents, such as plasticizers represented by epoxidized oils, socalled chemical plasticizers, such as triphenyl phosphate, tricresyl phosphate, dicyclohexyl phthalate, butylbenzyl phthalate, and others. Of course, it is understood that aminoplast resins may be employed alone.

Aminoplast resins which are the preferred crosslinking agent for interpolymers of hydroxyl esters of unsaturated acids and for alkyd resins are derived from the reaction of a compound containing a plurality of NH$_2$- groups (e.g., urea, melamine, acetoguanamine or benzoguanamine) with an aldehyde (e.g., formaldehyde). In preparing aminoplasts, the aldehyde or its equivalent is usually dissolved in an alkanol, such as butyl alcohol, and at least a part of the N-methylol groups on the aminoplast are converted into N-oxyalkyl groups. It is preferred that the alkyl groups be butyl, i.e., that the curing agent be a butylated aminoplast.

Also suitable are amine-aldehyde condensation products of melamine, such as hexamethoxymethyl melamine, hexakis(methoxymethyl)melamine, ethoxymethotymethyl melamine, hexylated methylated methylol-melamine and the like.

Further information as to the preparation and characteristics of aminoplast resins are contained in the aforementioned book entitled "ORGANIC COATING TECHNOLOGY", Chapter 8, pp 326–350.

Examples of thermosetting resin compositions comprising mixtures of an interpolymer of a hydroxyalkyl ester and an aminoplast resin are further described in U.S. Pat. No. 2,681,897; and further details for the preparation of aminoplast resins and alkyd resins which may be employed are described in U.S. Pat. No. 3,113,117.

Another group of thermosetting resins which may be used are carboxylic acid amide interpolymers of the type disclosed in U.S. Pat. Nos. 3,037,963 and 3,118,853. These interpolymers are prepared by forming an interpolymer of an unsaturated carboxylic acid amide, such as acrylamide or methacrylamide, with at least one other polymerizable ethylenically-unsaturated monomer, and then reacting the interpolymer with an aldehyde, such as formaldehyde, in the presence of an alcohol, such as butanol.

The aldehyde reacts with amide groups to form methylol groups and the butanol or other alcohol causes etherification so that at least some of the methylol groups are converted to groups of the structure:

—ROR$_1$ wherein R is a saturated lower aliphatic hydrocarbon radical having its free valences on a single carbon atom, and R$_1$ is a member of the class consisting of hydrogen and the radical derived by removing the hydroxyl group form the alkanol.

It is desirable that at least about 50 percent of the methylol groups be etherified since compositions having less than about 50 percent of the methylol groups etherified will tend to be unstable and subject to gelation.

Any polymerizable monomeric compound containing at least one CH$_2$=C< group may be polymerized with the unsaturated carboxylic acid amide. Examples of such monomers include styrene, isobutylene, vinyl chloride, vinylidene chloride, vinyl acetate, methyl methacrylate, ethyl acrylate, acrylonitrile, methacrylic acid, etc.

The preparation of the amide interpolymer is described in detail in U.S. Pat. Nos. 2,870,116 and 2,870,117.

Aldehyde modified and etherified amide interpolymers can also be produced by first reacting the unsaturated amide with an aldehyde and, if desired, an alcohol, to form an N-alkylol or an N-alkoxyalkyl-substituted amide. The N-substituted amide then is interpolymerized with the other monomer or monomers as described above, thereby producing interpolymers having the aforesaid recurrent groups without the need for further reaction. Such a method utilizing N-alkoxyalkyl-substituted amides is described in U.S. Pat. No. 3,079,434.

Other thermosetting resin compositions which may be used include ethylenically-unsaturated polyester resins obtained by the condensation of a glycol, such as ethylene glycol, propylene glycol, etc., and a polycarboxylic acid, such as maleic acid, fumaric acid, etc., in combination with a vinylidene monomer, such as styrene, vinyl toluene, etc.; and the epoxy resins such as obtained by the combination of bisphenol and epichlorohydrin (e.g., Epon resins) in combination with a curing catalyst such as a polyamine (e.g., ethylene diamine).

Mixtures of two or more thermosetting resins may also be employed, as can mixtures of thermoplastic and thermosetting resins.

As pointed out hereinabove, these polymers may be blended or admixed with other curing agents, crosslinking agents or other reactive materials, depending on the desired results.

As indicated previously, the solution prepared in accordance with the principal process of this invention, in addition to the water-immiscible organic polymer, contains a water-immiscible solvent for the polymer and a water-immiscible lower volatility non-solvent which is miscible with the polymer solvent.

The major criteria for the polymer solvent is that it be a good solvent for the particular polymer employed, that it be immiscible with water, and that it be more volatile than the non-solvent so that it will evaporate before the non-solvent. Thus, the solution is formulated so that upon evaporation of the solvent, the polymer will gel with the simultaneous precipitation of discrete, minute droplets of the non-solvent into the gelling polymer, thereby producing microcapsules containing droplets of the non-solvent entrapped therein. This phenomena, i.e., "non-solvent precipitation" has been employed heretofore in the production of voids in a film, but not in the production of microcapsules. For a detailed discussion of this phenomena in the formation of voids in films, see U.S. Pat. No. 3,655,191, incorporated herein by reference.

The solvents or solvent combinations employed herein will vary somewhat, depending on the particular resin utilized. For example, solvents which are suitable for use with interpolymers of hydroxyl esters of unsaturated acids and an aminoplast resin include xylene, benzene, toluene, amyl acetate, butyl acetate, butyl propionate, dibutyl phthalate, diethyl phthalate, diethyl ether, ethyl phenyl ether, diphenyl ether, butyl benzyl ether, etc. When the thermosetting resin composition comprises an alkyd resin and an aminoplast resin, suitable solvents include alcohols having 4 or more carbon atoms, such as butyl alcohol, amyl alcohol, nonyl alcohol, octyl alcohol, etc.; aromatic hydrocarbons, such as xylene or toluene; ketones such as methyl ethyl ketone, methyl isobutyl ketone, cyclohexanone, isophorone, etc.; esters, such as isopropyl acetate, butyl acetate, amyl acetate, nonyl acetate; phosphates, such as tributyl phosphate; and chlorinated hydrocarbons, such as methylene chloride. Combinations of certain solvents are likewise suitable in some instances.

When thermoplastic polymers are utilized, methylene chloride has been found to be particularly useful.

The basic requirements for the non-solvent are that it be a non-solvent for the polymer employed; that it be immiscible in water; that it be miscible with the solvent; that is be sufficiently low in volatility (i.e., evaporation rate) to remain in the system until after the solvent has evaporated; and that it be present in an amount sufficient to produce upon drying or evaporation substantially closed void-containing microcapsules.

The non-solvent is a non-solvent for the polymer and it is preferable that the non-solvent be volatile or at least volatilizable so that the non-solvent can be readily removed from the microcapsule when desired. Non-solvents of very high boiling points may be useful, for example, those having boiling points up to the melting point of the polymer or even higher may be used. Sublimable solids can also be used under appropriate conditions. While essentially non-voltile non-solvents may be useful, they require removal by extraction or similar means which require additional processing and thus are relatively undesirable. It will be understood that each polymer will have its own series of usable and optimal non-solvents. Those most suited for any particular system may be readily selected by the skilled artisan on the basis of the known physical properties of liquids and polymers. One method which may be employed in selecting the optimum non-solvent for a particular resin system is the method of Hansen ["THE THREE DIMENSIONAL SOLUBILITY PARAMETER AND SOLVENT DIFFUSION COEFFICIENT AND THEIR IMPORTANCE IN SURFACE COATING FORMATION", Copenhagan, Danish Technical Press (1967)] to determine liquids which will not solubilize the particular polymer selected. Once these liquids are ascertained, the solubility parameters found in the work of Hoy ("TABLES OF SOLUBILITY PARAMETERS", Union Carbide Corporation, South Charleston, West Virginia, May 31, 1967) may be utilized. The work of Hoy tabulates the relative evaporation rates of liquids wherein a non-solvent can be selected which has a low enough volatility to remain in the coating long enough to form voids before evaporating.

An example of utilizing the foregoing method can be illustrated by selecting poly(vinylacetate) as the polymer system. The Hansen parameters for this system are d 9.3, p 5.0, h 4.0 and r 4.9. Thus, the only practical materials outside this large solubility sphere are the water-soluble liquids, such as glycols, alcohols, amines, etc., and the non-polar aliphatics such as hexane, cyclohexane, carbon tetrachloride, etc. Since water-solubles are not preferred, the non-polar aliphatics would be selected. Referring to the Hoy tabulation of relative evaporation rates (which is based on butyl acetate as 100), it can be seen that the aliphatic hydrocarbons, such as decane (boiling point 172° C., relative evaporation rate 12.96; undecane (boiling point 193° C., relative evaporation rate 4.41) and dodecane (boiling point 214° C., relative evaporation rate 1.42) are all reasonable non-solvents for the poly(vinylacetate) resin system. A commercially-available liquid non-solvent which will simulate these pure, commercially available compounds is usually chosen and utilized.

Some examples of non-solvents which have been found particularly useful are odorless mineral spirits, high flash aliphatic naphtha, naphthenic mineral oil, neat's foot oil, pine oil, and the like. The odorless aliphatic mineral spirits and high flash aliphatic naphthas generally have a boiling point range of from about 300° to about 600° F., preferably from about 400° F. to 550° F. Typical mixed aliphatic-aromatic compounds which may be employed as non-solvents are phenyl cyclohexane, triethyl benzene, phenyl propane, and the like. Various other compounds may be employed as non-solvents, such as dicyclohexyl amine, isoamyl bromide, trichloropropane, methyl benzyl ketone, allyl butyrate and the like. Some of the preferred non-solvents include n-heptane and VM&P naphtha.

In the preparation of the solution, the weight ratio of the non-solvent to the solvent generally falls in the range of from about 1:1 to about 1:100. This non-solvent to solvent ratio may be varied widely and such ratios are dependent upon the strength of the solvent, the resin solubility, the size of the voids desired in the microcapsules, and other desired results. However, for purposes of the present invention, the preferred ratio is from about 1:1 to about 1:20, and the most preferred range is from 1:6 to about 1:20.

As indicated above, the polymer composition utilized in the first step of the process of this invention can also be an emulsion containing as the continuous phase a water-immiscible organic polymer dissolved in a water-immiscible solvent for the polymer and as the discontinuous phase minute droplets of a lower voltaility non-solvent dispersed in the continuous phase.

Organic polymers which may be utilized in preparing the emulsion herein may include essentially any of those thermoplastic or thermosetting resins heretofore described in connection with the preparation of the homogeneous solution with the major criteria again being that the polymer selected be insoluble in water. The selection of suitable polymers for preparing the emulsion can be made on the basis of the known physical properties of organic polymers and liquids and is within the skill of the art. Similarly, the solvent for the organic polymer employed in the emulsion may be any of these previously described, so long as the solvent selected is immiscible in water. The major criteria of the non-solvent employed in the emulsion is that the non-solvent be a non-solvent for the polymer selected; that it be of lower volatility than the solvent and that it be immiscible with the solvent. In the emulsion, one important point of departure from the solution technique is that the non-solvent utilized need not be immiscible in water. The reason for this is that the non-solvent utilized need not be immiscible in water. The reason for this is that in the emulsion the non-solvent is emulsified in the form of fine droplets in the polymer phase in the presence of a surfactant and is thereby protected from extraction by the water of the coating composition. Accordingly, as indicated, the non-solvent of the emulsion need not be immiscible in water and, in fact, a preferred non-solvent employed in the emulsion is water. The selection of suitable non-solvents for use in the emulsion can be made utilizing the known physical properties of liquids and polymers and the methods of Hansen and the work of Hoy discussed above.

The amounts of solvent and non-solvent employed in the emulsionwill, in general, be substantially the same as the ratios of solvent to non-solvent utilized in the preparation of the solution.

In preparing the emulsion, conventional emulsion techniques are utilized. Thus, in general, the polymer is dissolved in the polymer solvent to form a polymer solution which is the continuous phase, following which the non-solvent is emulsified into the solution under agitation and in the presence of an appropriate surfactant to produce a discontinuous phase of fine droplets of the non-solvent dispersed in the continuous phase. Since, as mentioned above and described hereinafter, the second step of the process of the invention is to emulsify the polymer composition prepared in the first step into a water-based coating composition, the use of an emulsion as the polymer composition represents a double emulsion technique.

As indicated above, in preparing the emulsion, an appropriate surfactant should be used. As was also previously indicated, the second step in the process of this invention, whether the polymer composition is either a solution or an emulsion, is to emulsify the polymer composition into a water-based coating composition. In general, the surfactants utilized in preparing the emulsion in the first step of the process may also be utilized in emulsifying the solution or emulsion into the water-based coating composition. Accordingly, the discussion of surfactants which follows applies both to the preparation of the emulsion of this embodiment and to the surfactants utilized in the second step of the process of this invention.

The surfactant utilized may be an anionic surfactant, a non-ionic surfactant, a cationic surfactant, an amphoteric surfactant or combinations thereof. The surfactant is generally present in an amount ranging from about one percent to about 10 percent by weight, based on the polymer solids employed. As will be understood, the surfactant selection will depend upon the polymer, solvent and non-solvents utilized.

For example, when water is emulsified in a polymer solution of methylene chloride, surfactants such as a sodium salt of a sulfate ester of an alkylphenoxy poly(ethyleneoxy)ethanol and dioctyl sodium sulfosuccinate have been successfully employed and are preferred.

Anionic surfactants that may be employed include ammonium salt of a sulfated linear primary alcohol ethoxylate, sodium methyl oleoyl taurate, phosphated alkali sodium hydrocarbon sulfonate, amine polymer solution, phosphated ester, sulfated fatty acid esters, lanolin fatty acids, alkylaryl sulfonate, linear dodecylbenzene fulfonic acid, tall oil derivatives and the like.

Non-ionic surfactants include liquid lanolin oil, lanolin linoleates, lanolin ricinoleates, wove wax alcohols, sorbitan monolaurate, sorbitan monooleate, sorbitan monostearate, polyoxyethylene sorbitan monolaurate, polyoxyalkylene fatty alcohols, fatty alcohol polyether, ethoxylated lauric acid, ethoxylated stearic acid, ethoxylated mono- and diglyceride, polyoxyethylene sorbitol beeswax derivatives, alkyl polyether alcohols and the like. Cationic surfactants include fatty amine complex imidazoline type, tertiary amine salts, alkyl dimethyl amine oxide, oleyl dimethyl amine oxide, lauryl dimethyl benzyl ammonium chloride, quaternary ammonium derivatives, polyethoxylated quaternary ammonium salts, substituted oxazoline, hydroxyethyl imidazolene based on stearic, tetradecylpyridinium bromide, and the like.

As described above, the second step in the process of this invention is to emulsity the solution or emulsion into a water-based coating composition.

Various water-based coating compositions may be utilized in practicing the process of this invention. Thus, any of the water-based coating compositions utilized or known in the coatings industry heretofore may be employed. For example, water-based coating compositions derived from aqueous polymer lattices (e.g., latex based coatings or paints), water-soluble polymers, aqueous polymer emulsions and aqueous polymer dispersions are suitable. The preferred water-based coating compositions employed in the practice of this invention as those derived from polymer lattices.

Various lattices may be utilized in practicing the process of this invention. The term "latex" as used herein is a term well-known in the art and describes a two-phase system. The first phase is referred to as the continuous phase and is made up essentially of water and at times certain soluble additives to effect various results (e.g., emulsifying agents). A preferred additive is a glycol, such as ethylene or propylene glycol, which improves the flow characteristics of the wet film. The second phase is a distinctly separate phase dispersed in the first phase, referred to as the discontinuous phase since it comprises a plurality of particles of polymeric materials. Although the polymeric particles may be of any convenient size, within the meaning of the term, the particles must form a distinct second phase as opposed to solutions and quasi-solutions. It is therefore readily seen that this type of water dispersion adds much commercial flexibility to a film making system when compared with a system which requires the great bulk and non-flexiblity of a solution or quasi-solution.

The polymeric particles can be particles of any coalescable polymer which can be stably dispersed in water. By "coalescable polymer" is meant a polymer which, either alone or in the presence of coalescing aids such as plasticizers and the like, form a continuous film at the temperature of use. Ordinarily, polymers which are coalescable at room temperature are preferred, but others which require heating or particular conditions to provide continuous films can also be employed. Mixtures of polymers, which may or may not be coreactive, are also useful; such mixtures can be either in the same particles or in different particles dispersed in the composition.

Among the polymers which can be utilized are hompolymers and copolymers of various monomers, such as vinyl esters of saturated carboxylic acids, for example, vinyl acetate, vinyl propionate, or the like; alkyl or aryl esters of unsaturated carboxylic acids, including acrylates and methacrylates, such as ethyl acrylate, butyl acrylate, 2-ethylhexyl acrylate, methyl methacrylate, phenyl acrylate, etc., and maleates and fumarates such as dimethyl maleate, butyl hydrogen fumarate, methyl ethyl maleate, and the like; unsaturated hydrocarbons, including aliphatic and aromatic monomers such as ethylene, butadiene, styrene and vinyl toluene; vinyl halides, such as vinyl chloride, vinyl bromide and vinylidene chloride; unsaturated nitriles, such as acrylonitrile and methacrylonitrile; unsaturated amides, such as acrylamide, N-substituted acrylamide, and methacrylamide; unsaturated carboxylic acids, such as acrylic acid, methacrylic acid, maleic acid or anhydride, and fumaric acid; and other polymerizable monomers of various types.

In many cases preferred polymers comprise combinations of the above monomers, e.g., vinyl acetate-alkyl acrylate copolymers, alkyl acrylatestyrene copolymers and styrene-butadiene copolymers.

Other coalescable polymers which are useful under appropriate conditions include alkyd resins, both oil-modified and non-oil modified, and including alkyds modified by reaction with materials such as styrene or acrylic monomers; phenolic resins, i.e., condensates of a phenol and an aldehyde; epoxy resins, including esterified epoxies and epoxidized oils; polyurethanes, where these are made so as to be stably dispersed in water; aminoplast resins, i.e., aldehyde condensates of melamines, urea, benzoguanamine, or similar compounds; naturally-occurring materials, such as rubber, shellac, casein, etc.; and other polymers which are coalescable and water-dispersible.

The preferred coalescable polymers for use in lattices employed in the practive of this invention are acrylic polymers, i.e., polymers containing one or more acrylates or methacrylates, copolymers of vinyl acetate with a minor amount of a vinyl halide or an ester of an unsaturated acid, and copolymers of vinyl aromatic hydrocarbons with alkyl acrylates, dienes or other monomers.

As can be seen from the foregoing non-limiting list, a wide variety of lattices of water-insoluble film-forming polymers and copolymers may be utilized in the process of this invention. For a detailed description of such lattices and additional lattices which may be utilized in practicing the process of this invention, see U.S. Pat. No. 3,669,728 to Seiner, dated June 13, 1972, incorporated herein by reference.

As will be understood, the water-based coating composition employed in practicing the process of this invention may contain various other additives commonly utilized by the coatings industry in such compositions. Thus, these compositions may contain conventional pigments, plasticizers, flow control agents, surface active agents, adhesion promoters, and the like.

As aforementioned, the second step of the process of this invention is to emulsify under agitation and in the presence of a surfactant the above-described polymer compositions (i.e., the homogeneous solution or emulsion) into a water-based coating composition such as those previously described. This processing step can be performed by utilizing processing equipment and conditions (i.e., mixing speeds, temperatures, etc.) which are conventionally employed in the coatings industry in formulating water-based coatings. Thus, conventional mixing equipment such as a standard Cowles mixer operated at conventional mixing speed and mixing temperatures (e.g., 140° F. or less) may be utilized. At the completion of this step, a water-based coating composition containing the emulsified polymer composition (i.e., solution or emulsion) is produced. At this time, the coating composition can be regarded as containing therein a microcapsular precursor. As described hereinafter, this principal process when carried to completion will produce microcapsules in-situ in the resultant film. Alternatively, as will be described below, at this point of the process, microcapsules having non-solvent entrapped therein can be produced in the water-based coating composition.

The next step (i.e., third step) in the process of this invention is to apply the water-based coating composition containing the microcapsule precursor to the substrate. The coating composition can be so applied by any of the application methods conventionally employed in the coatings industry, such as, for example, brushing, dipping, roll coating, flow coating, spraying and the like.

Following application of the water-based coating composition containing the microcapsule precursors to the substrate, the next step is to evaporate the polymer solvent from the microcapsule precursors (i.e., emulsified solution or emulsion) to produce microcapsules having encapsulated or entrapped therein discrete droplets of the lower volatility non-solvent. As discussed previously above, the mechanism of microcapsule formation when the microcapsule precursor is an emulsified polymer composition which is a solution involves the non-solvent precipitation phenomena. When the microcapsule precursor is an emulsion as described above, the mechanism of microcapsule formation when the solvent is evaporated involves the gellation of the polymer around droplets of the non-solvent. In either case, microcapsules having entrapped therein droplets of the non-solvent are produced. The solvent evaporation step is peferably performed under ambient temperature conditions but heating can also be utilized. In this latter situation, i.e., heating to remove the solvent, the heating temperature should be controlled so that the solvent is volatilized off before the lower volatility non-solvent if the desired microcapsules are to be produced. Thus, a heating temperature above the boiling point of the solvent but below the boiling point of the non-solvent should be utilized.

Finally, the applied coating composition containing the microcapsules having the non-solvent entrapped therein is dried to remove the water from the water-based coating composition and the non-solvent from the microcapsules, thereby producing a film having incorporated therein in-situ prepared structured, closed celled, void-containing microcapsules. In this stage of the process, the drying process depending upon the specific coating composition employed and the nature and type of the non-solvent can be performed either by air-drying or by baking (i.e., heating). When baking is to be utilized in drying, the baking temperatures employed may vary considerably, again depending upon the particular coatng composition involved.

As is apparent, the above-described principal process of this invention is directed to the production of films containing in-situ prepared void-containing microcapsules. However, as mentioned during the discussion of the second step of the process, the process also has the capability of providing for the production in-situ in the water-based coating composition of microcapsules containing the non-solvent entrapped therein. This can be accomplished by utilizing a polymer composition (i.e., solution or emulsion) in which the polymer solvent is sufficiently volatile to be evaporated during the mixing process. Thus, if the polymer solvent selected is sufficiently volatile, it can be evaporated during the second step of the process (i.e., emulsifying the polymer composition into the coating composition by control of mixing speed, mixing temperature and mixing time to thereby produce non-solvent containing microcapsules in the latex. These factors (i.e., solvent selection and mixing conditions) can be determined by the skilled artisan by reference to the known properties of liquids and polymers and by routine experimentation.

In addition to the foregoing principal process of producing void-containing microcapsules in-situ in a film or non-solvent containing microcapsules in-situ in the water-based coating composition, the process of this invention has the further flexibility and versatility in that it provides for the in-situ production of microcapsules either in the coating composition or film formed therefrom, in which certain non-solvent materials which serve a secondary function remain entrapped in the polymeric microcapsules. Thus, the process of this invention is also applicable to the in-situ production of microcapsules in which the non-solvent material can perform a secondary function in addition to the formation of the microcapsules and remains in the polymeric microcapsule until performance of the additional function is desired. Thus, the non-solvent can be encapsulated in the polymeric microcapsules and remain entrapped until the wall is ruptured, punctured or worn away, or until it diffuses through the wall. The polymer of the polymeric wall of the microcapsule may be selected so that it is biodegradable, and thus slowly releases the entrapped non-solvent. Accordingly, in some instances, the non-solvent may be a solid, liquid or a gas, depending upon the function desired. For example, the non-solvent may be a medicament; mineral; biocide, such as insecticides; chemical reactant, such as curing agents, catalysts, and the like; herbicides, fungicide, mildewcide, and the like; as well as perfumes; odorants; fertilizers; repellants; and the like.

In addition, various adjuvants may be incorporated in the microcapsules by the process of this invention; for example, conventional pigments may be incorporated. These include titanium dioxide, encapsulated aluminum silica, lead silica chromate, carbon black, talc, barium sulfate, and the like, as well as combinations of these and similar pigments. Colored pigments such as cadmium red, cadmium yellow, phthalocyanine blue, phthalocyanine green, chrome green, toluidine red, hydrated iron oxide, and the like may be included if desired. Also, other adjuvants may be incorporated, such as dispersing agents, surface-active agents, adhesion promoting agents, melting agents, flow agents, anti-oxidants, chemical reactants, and the like.

The pigments referred to above may be incorporated, either in the polymeric material or the non-solvent. If the pigment has been dispersed in the non-solvent when the non-solvent is evaporated, the pigment will remain entrapped in the voids; while, on the other hand, if the pigment has been incorporated into the polymeric material, the pigment will then remain in the walls of the microcapsules.

Set forth below are several examples illustrating the in-situ manufacture of microcapsules by the process of this invention, including its various embodiments. The examples are merely illustrative and should not be construed as limiting the invention. All parts and percentages are by weight unless otherwise indicated.

EXAMPLE I

This example illustrates the production of void-containing microcapsules in-situ in a film in which a homogenous solution is employed as the microcapsule precursor material.

In this example a homogenous solution was first prepared by admixing 60 grams of polystyrene (molecular weight 70,000) with 200 grams of methylene chloride (solvent) and 200 grams of n-heptane (non-solvent). This solution was then emulsified under agitation using a standard Cowles mixer into a standard acrylic latex in the presence of a surfactant. The acrylic latex utilized was a commercial latex designated AC388 (a 50 percent total solids acrylic polymer latex derived from a monomer mixture containing 43 percent methyl methacrylate, 55 percent butyl acrylate and 2 percent methacrylic acid) available from the Rohm and Haas Company. The surfactant utilized was a commercial surfactant designated Alipal CO433 (the sodium salt of an alkylphenoxypolyethyleneoxy ethanol) available from GAF Corporation. A sample of latex containing this emulsified solution (i.e., microcapsule precursor) was then sprayed, utilizing a conventional spray gun, onto a metal Q-panel (Bonderite 100) and permitted to air-dry. Upon drying, the resultant film exhibited opacity indicating the presence of void-containing microcapsules. An additional sample of this latex was then applied to a microscope slide and polaroid photographs of the latex sample were taken during the air-drying process, utilizing light from below the slides to show the presence of microcapsules. The photographs, in sequence, showed the presence of the microcapsule precursors (i.e., droplets of emulsified solution), the formation of microcapsules containing droplets of non-solvent upon evaporation of the solvent, and the formation of void-containing microcapsules upon evaporation of the non-solvent. As will be understood, the microcapsules photographed during their formation with bottom light appeared black in coloration due to the deflection of the light passing from below. Application of top light to the dried film showed opacity (i.e., whiteness), proving that the void-containing microcapsules formed by the process provide opacity.

EXAMPLE II

This example illustrates the production of void-containing microcapsules in-situ in a film in which an emulsion is employed as the microcapsule precursor material.

In this example, an emulsion was prepared by first dissolving 15 grams of polystyrene (molecular weight 70,000) in 300 grams of methylene chloride to form a continuous phase polymer solution. Into this polymer solution was then emulsified (utilizing a Cowles mixer) a mixture of 45 grams of water, 3 grams of Alipal CO433 surfactant and 2 grams of RE410 (free acid of a complex organic phosphate ester) commercial surfactant available from GAF Company, thereby forming as the discontinuous phase droplets of water dispersed in the continuous polymer solution phase. This emulsion was then emulsified under agitation utilizing a Cowles mixer into an acrylic latex composition. The acrylic latex composition consisted of 300 grams of AC388 acrylic latex, 300 grams of water and 2 grams of Empapol PO-18 (potassium oleate) surfactant to form a latex composition containing as the microcapsule precursor the above-described emulsion. This latex composition was then applied to a substrate as in Example I and also permitted to air-dry. The resultant film showed opacity, indicating the presence in the film of in-situ produced void-containing microcapsules.

According to the provisions of the Patent Statutes there is described above the invention and what are considered to be its best embodiments. However, within the scope of the appended claims, it is to be understood that the invention can be practiced otherwise than as specifically described.

We claim:

1. A method of preparing void-containing microcapsules in-situ in a film which comprises the steps of:
   A. preparing a polymer composition selected from the group consisting of:
      1. a homogenous solution containing a water-immiscible organic polymer, a water immiscible solvent for the polymer and a water-immiscible lower volatility non-solvent which is miscible with the solvent, and
      2. an emulsion containing as the continuous phase a water-immiscible organic polymer dissolved in a water immiscible solvent for the polymer and as the discontinuous phase droplets of a lower volatility non-solvent dispersed in the continuous phase;

B. emulsifying said polymer composition into a water-based polymer coating composition under agitation and in the presence of a surfactant;

C. applying the water-based polymer coating composition containing said emulsified polymer composition to a substrate;

D. evaporating the polymer solvent from the emulsified polymer composition to produce in-situ in said applied coating composition microcapsules having entrapped therein discrete droplets of the lower volatility non-solvent; and E. drying said coating composition to evaporate the lower volatility non-solvent from the microcapsules thereby producing a film having incorporated therein sructured, closed-celled, void-containing microcapsules.

2. The method of claim 1 wherein the polymer composition contains a polymer selected from the group consisting of thermoplastic and thermosetting resins.

3. The method of claim 2 wherein the thermoplastic resin is selected from the group consisting of an alkyl acrylate or methacrylate, polystyrene, copolymers of styrene and vinyl monomers, polyolefins, and polycarbonates.

4. The method of claim 3 wherein the thermoplastic resin is polystyrene.

5. The method of claim 2 wherein the thermosetting resin is selected from the group consisting of interpolymers of hydroxyesters of ethylenically-unsaturated acids with at least one other polymerizable, ethylenically-unsaturated monomer, alkyd resins, and carboxylic acid-amide interpolymers.

6. The method of claim 2 wherein the thermosetting resin is a copolymer of an alkyl methacrylate and an aziridinyl alkyl methacrylate.

7. The method of claim 1 wherein the solution consists of polystyrene, methylene chloride and n-heptane.

8. The method of claim 1 wherein the emulsion contains as the continuous phase polystyrene dissolved in methylene chloride and as the discontinuous phase droplets of water dispersed in the continuous phase.

9. The method of claim 1 wherein the solution has a non-solvent to solvent weight ratio of 1:1 to 1:100.

10. The method of claim 1 wherein the solution has a non-solvent to solvent weight ratio of 1:1 to 1:20.

11. The method of claim 1 wherein the emulsion has a non-solvent to solvent weight ratio of 1:1 to 1:100.

12. The method of claim 1 wherein the surfactant is selected from the group consisting of anionic, non-ionic, cationic and amphoteric surfactants.

13. The method of claim 1 wherein the surfactant is a sodium salt of a sulfate ester of an alkylphenoxy poly(ethyleneoxy)ethanol.

14. The method of claim 1 wherein the surfactant is potassium oleate.

15. The method of claim 1 wherein the water-based coating composition comprises an aqueous polymer latex, an aqueous polymer emulsion, a water-soluble polymer or an aqueous polymer dispersion.

16. The method of claim 1 wherein the water-based coating composition comprises an acrylic polymer latex.

17. The method of claim 16 wherein the acrylic polymer is derived from a monomer mixture containing methyl methacrylate, butyl methacrylate, and methacrylic acid.

18. The method of claim 1 wherein the solvent is evaporated by air-drying.

19. The method of claim 1 wherein the solvent is evaporated by heating.

20. The method of claim 1 wherein the water-based coating composition is dried by air-drying or baking.

21. The method of claim 1 wherein the polymer composition has pigment incorporated in the polymer solvent.

22. The method of claim 1 wherein the polymer composition has pigment incorporated in the non-solvent.

23. A method of preparing in-situ in a film microcapsules having encapsulated therein non-solvents which serve a secondary function and remain encapsulated until the performance of the secondary function is desired, said method comprising the steps of:

A. preparing a polymer composition selected from the group consisting of:
1. a homogeneous solution containing a water-immiscible organic polymer, or water immiscible solvent for the polymer and a water-immiscible lower volatility non-solvent which is miscible with the solvent, and
2. an emulsion containing as the continuous phase a water-immiscible organic polymer dissolved in a water immiscible solvent for the polymer and as the discontinuous phase droplets of a lower volatility non-solvent dispersed in the continuous phase;

B. emulsifying said polymer composition into a water-based polymer coating composition under agitation and in the presence of a surfactant;

C. applying said water-based polymer coating composition containing said emulsified polymer composition to a substrate; and D. evaporating the polymer solvent from the polymer composition to produce in-situ a film formed from the water-based coating composition microcapsules having entrapped therein the non-solvent.

24. The method of claim 23 wherein the non-solvent is selected from the group consisting of medicaments, minerals, biocides, perfumes, fertilizers, and chemical reactants.

25. The method of claim 23 wherein the polymer composition contains a polymer selected from the group consisting of thermoplastic and thermosetting resins.

26. The method of claim 25 wherein the thermoplastic resin is selected from the group consisting of an alkyl acrylate or methacrylate, polystyrene, copolymers of styrene and vinyl monomers, polyolefins, and polycarbonates.

27. The method of claim 26 wherein the thermoplastic resin is polystyrene.

28. The method of claim 25 wherein the thermosetting resin is selected from the group consisting of interpolymers of hydroxyesters of ethylenically-unsaturated acids with at least one other polymerizable, ethylenically-unsaturated monomer, alkyd resins, and carboxylic acid-amide interpolymers.

29. The method of claim 25 wherein the thermosetting resin is a copolymer of an alkyl methacrylate and an aziridinyl alkyl methacrylate.

* * * * *